(12) United States Patent
Delamour et al.

(10) Patent No.: US 8,919,499 B2
(45) Date of Patent: Dec. 30, 2014

(54) CIRCUIT AND A METHOD FOR FEEDING OIL TO ROLLING BEARINGS IN A TURBOMACHINE

(75) Inventors: Francois Delamour, Rubelles (FR); Jean-Louis Muller, Moissy Cramayel (FR); Nicolas Alain Bernard Potel, Maisons Alfort (FR); Jean-Louis Jacquerie, Antheit (BE); Albert Cornet, Verviers (BE)

(73) Assignee: SNECMA, Paris (FR)

( * ) Notice: Subject to any disclaimer, the term of this patent is extended or adjusted under 35 U.S.C. 154(b) by 281 days.

(21) Appl. No.: 13/104,297

(22) Filed: May 10, 2011

(65) Prior Publication Data
US 2012/0024631 A1 Feb. 2, 2012

(30) Foreign Application Priority Data
May 11, 2010 (FR) ...................................... 10 53703

(51) Int. Cl.
| F01M 1/02 | (2006.01) |
| F16H 57/04 | (2010.01) |
| F01M 1/16 | (2006.01) |
| F16N 7/40 | (2006.01) |
| F01D 25/20 | (2006.01) |

(52) U.S. Cl.
CPC ...... *F16N 7/40* (2013.01); *F01D 25/20* (2013.01); *F16N 2210/02* (2013.01)
USPC ....................................................... 184/6.12

(58) Field of Classification Search
USPC ......................................... 184/6.11, 6.12, 7.3
See application file for complete search history.

(56) References Cited

U.S. PATENT DOCUMENTS

| 4,452,188 | A | * | 6/1984 | Kosuda et al. ............. 123/90.18 |
| 4,891,934 | A | * | 1/1990 | Huelster ....................... 60/39.08 |
| 5,211,542 | A | * | 5/1993 | Fraser et al. ..................... 417/53 |
| 2005/0061290 | A1 | * | 3/2005 | Plenzler et al. .......... 123/196 M |
| 2010/0025158 | A1 | * | 2/2010 | Allam ............................. 184/6.3 |
| 2011/0067668 | A1 | * | 3/2011 | Miyachi et al. ........... 123/196 R |

FOREIGN PATENT DOCUMENTS

FR 2 450 348 A1 9/1980

OTHER PUBLICATIONS

French Preliminary Search Report issued Dec. 29, 2010, in French Application No. 1053703, filed May 11, 2010 (with English Translation of Category of Cited Documents).

* cited by examiner

*Primary Examiner* — William E Dondero
*Assistant Examiner* — Mark K Buse
(74) *Attorney, Agent, or Firm* — Oblon, Spivak, McClelland, Maier & Neustadt, L.L.P.

(57) ABSTRACT

A circuit and a method for feeding oil to rolling bearings in a turbomachine is disclosed. The circuit includes an oil supply; an oil duct connecting the supply to lubrication enclosures, each enclosure containing at least one rolling bearing; an oil feed pump located between the supply and the lubrication enclosures; an oil recovery pump connected downstream from each lubrication enclosure; a pressurizing valve placed in the duct between the oil feed pump and the lubrication enclosures, the pressurizing valve being adapted to open when the pressure at its inlet exceeds a predetermined threshold pressure; a branch connection duct connecting the inlet of the pressurization valve to one of the lubrication enclosures in order to feed it with oil; and a feeding device which feeds the lubrication enclosures at a small oil flow rate so long as the pressure at the inlet of the pressurization valve has not reached the predetermined threshold.

13 Claims, 1 Drawing Sheet

CIRCUIT AND A METHOD FOR FEEDING OIL TO ROLLING BEARINGS IN A TURBOMACHINE

BACKGROUND OF THE INVENTION

The present invention relates to the general field of rolling bearings in a turbomachine. More particularly, it relates to feeding oil to pressurized oil films in the rolling bearings of an aviation turbomachine.

An aviation turbomachine has a plurality of rolling bearings (ball bearings or roller bearings) housed in lubrication enclosures and serving to support rotation of the rotary shafts of the turbomachine (e.g. the shafts of the high- and low-pressure spools of a two-spool turbojet). Thus, a two-spool bypass type turbojet generally comprises one rolling bearing housed in a lubrication enclosure situated at the front (referred to as the "front bearing"), and two rolling bearings housed in lubrication enclosures situated at the rear of the turbojet (referred to as "rear bearings").

In order to obtain satisfactory operation of those rolling bearings, it is necessary firstly to lubricate and cool the rolling elements therein by injecting oil between their rings, and secondly to damp the vibration generated by the rotation of the shafts supported by those bearings by feeding oil under pressure to an oil film that is formed between the outer ring and a structural part of each bearing (referred to as a "squeeze film").

The oil used for lubricating and cooling the bearings and the oil feeding the vibration-damper films comes from a single oil circuit. Typically, such a circuit comprises an oil duct connecting the oil supply to the various lubrication enclosures that contain the rolling bearings of the turbomachine, an oil feed pump for taking oil from the supply and delivering it to the rolling bearings, and an oil recovery pump for recovering the oil that has been fed to the rolling bearings and returning it to the supply.

The oil feed pump of such a circuit is generally a positive displacement rotary pump that is driven in rotation by an outlet of the accessory gearbox of the turbojet, in turn driven by taking power from the high pressure shaft of the turbomachine. The flow rate of the pump is therefore directly proportional to the speed of rotation of the engine. However, over certain operating ranges of the engine, needs in terms of oil flow rate are not the same for all of the rolling bearings of a turbomachine. In particular, the front bearing of the turbojet, and more particularly its oil layer formed to damp vibration, needs to be fed with oil under pressure at an operating speed that is slower than idling (referred to as the sub-idling speed).

To do this, a known solution consists in dimensioning the oil feed circuit in such a manner that the requirements in terms of pressure and oil flow rate are covered for all operating speeds, in particular at the sub-idling speed. Nevertheless, with such a solution it is necessary to reinforce the feed and recovery pump elements of the oil circuit, thereby increasing its weight. The pressure level required at sub-idling speed implies very high pressures at full throttle. Another known solution consists in dedicating a special pump to the front bearing. In addition to constituting an additional potential source of failure, the impact of such a pump on the weight balance is not negligible.

OBJECT AND SUMMARY OF THE INVENTION

A main object of the present invention is thus to mitigate such drawbacks by proposing a circuit that enables oil to be fed at high pressure, not only at a sub-idling speed, but also to only one rolling bearing.

The object is achieved by a circuit for feeding oil to rolling bearings in a turbomachine, the circuit comprising: an oil supply, an oil duct connecting the supply to a plurality of lubrication enclosures connected in parallel and each containing at least one rolling bearing, an oil feed pump disposed in the duct between the supply and the lubrication enclosures in order to take oil from the supply and deliver it to the rolling bearings, and an oil recovery pump connected downstream from each lubrication enclosure in order to recover the oil that has been fed to the rolling bearings and return it to the supply, the circuit further comprising, in accordance with the invention, a pressurizing valve placed in the duct between the oil feed pump and the lubrication enclosures, said pressurizing valve being adapted to open when the pressure at its inlet exceeds a predetermined threshold pressure, a branch connection duct connecting the inlet of the pressurization valve to one of the lubrication enclosures in order to feed it with oil, and means for feeding the lubrication enclosures at a small oil flow rate so long as the pressure at the inlet of the pressurization valve has not reached the predetermined threshold.

The threshold pressure is determined in such a manner as to correspond to the oil pressure needed for feeding the rolling bearing situated in the enclosure in question (e.g. the bearing situated in the front enclosure) at a given operating speed (e.g. sub-idling speed). On starting, the pressurizing valve therefore remains closed and the lubrication enclosures are fed with oil at a low flow rate, thereby guaranteeing satisfactory operation of those bearings at very low speeds of operation of the turbomachine. The pressure at the outlet from the feed pump then increases up to the predetermined threshold pressure. During this stage, the pressure feeding the rolling bearing situated in the enclosure in question increases rapidly until it reaches a threshold pressure. Once the threshold pressure has been reached, the pressurizing valve opens and serves in particular to maintain the threshold pressure in said enclosure. As a result, it is possible to ensure that oil is fed at a high pressure level and is regulated as from a low speed of operation of the engine for one particular rolling bearing. Such a circuit presents the advantage of minimizing the number of new pieces of equipment that need to be installed (and thus minimizing overall weight), while limiting any risk of failure.

The circuit may include a bypass duct connecting the inlet of the pressurization valve to its outlet and having a flow section that is calibrated to allow lubrication enclosures to be fed with oil at a low flow rate. Alternatively, this feed may be provided by means of a calibrated leakage rate provided through the pressurizing valve.

The pressurizing valve may be of the check valve type having a rated spring.

The circuit may further include an accessory gearbox and a transfer gearbox connected to the supply by the duct and connected in parallel with the rolling bearings.

The invention also provides a turbojet including an oil feed circuit for rolling bearings as defined above.

The invention also provides a method of feeding oil to rolling bearings in a turbomachine, the bearings being connected in parallel in an oil circuit, the method consisting in: taking oil from an oil supply and delivering it to lubrication enclosures each containing at least one rolling bearing; and recovering the oil that has been fed to the lubrication enclosures and returning it to the supply. In accordance with the invention, the method consists in greatly reducing the flow rate of oil fed to certain lubrication enclosures so long as the oil feed pressure to one of the lubrication enclosures has not reached a predetermined threshold pressure.

BRIEF DESCRIPTION OF THE DRAWING

Other characteristics and advantages of the present invention appear from the following description given with reference to the accompanying drawings that show embodiments having no limiting character. In the figures.

DETAILED DESCRIPTION OF EMBODIMENTS

The invention is applicable to various types of turbomachine having a plurality of rolling bearings, and in particular to a turbojet of the two-spool and bypass type having a rolling bearing situated at the front (referred to as the "front bearing") and two rolling bearings situated at the rear (referred to as the "rear bearing").

In order to take up radial and axial loads, such a turbojet has a plurality of rolling bearings for supporting in rotation the shafts of the low- and high-pressure spools of the turbojet. More precisely, the low- and high-pressure spool shafts are supported at their front ends by a front bearing and at their rear ends by two rear bearings.

In order to guarantee satisfactory operation of those rolling bearings, it is necessary to ensure firstly that the rolling elements making them up are lubricated and cooled, and secondly that the vibration generated by the rotation of the shafts supported by those bearings is damped.

In practice, the rolling bearings are housed in lubrication enclosures (specifically in this example an enclosure 10 containing the front bearing, and two enclosures 12 and 14 containing the rear bearings), and oil under pressure is injected into those enclosures via injection nozzles between the bearing rings of each of those bearings. The oil is subsequently discharged or centrifuged to the outsides of the lubrication enclosures, removing by heat transfer the heat that is produced by the rolling elements of the bearings. In addition, the oil under pressure is confined between the outer ring and a structural part of the bearings. This oil under pressure is thus present at the contact surface between the outer ring and the structural part of the bearings in the form of an oil film (known as the "squeeze film") and it acts as a damper of the vibration generated by the rotation of the low- and high-pressure spool shafts. Reference may be made to documents EP 1 406 026 and EP 1 375 941, which show embodiments of rolling bearings having cooling and squeeze films.

Figure 1:
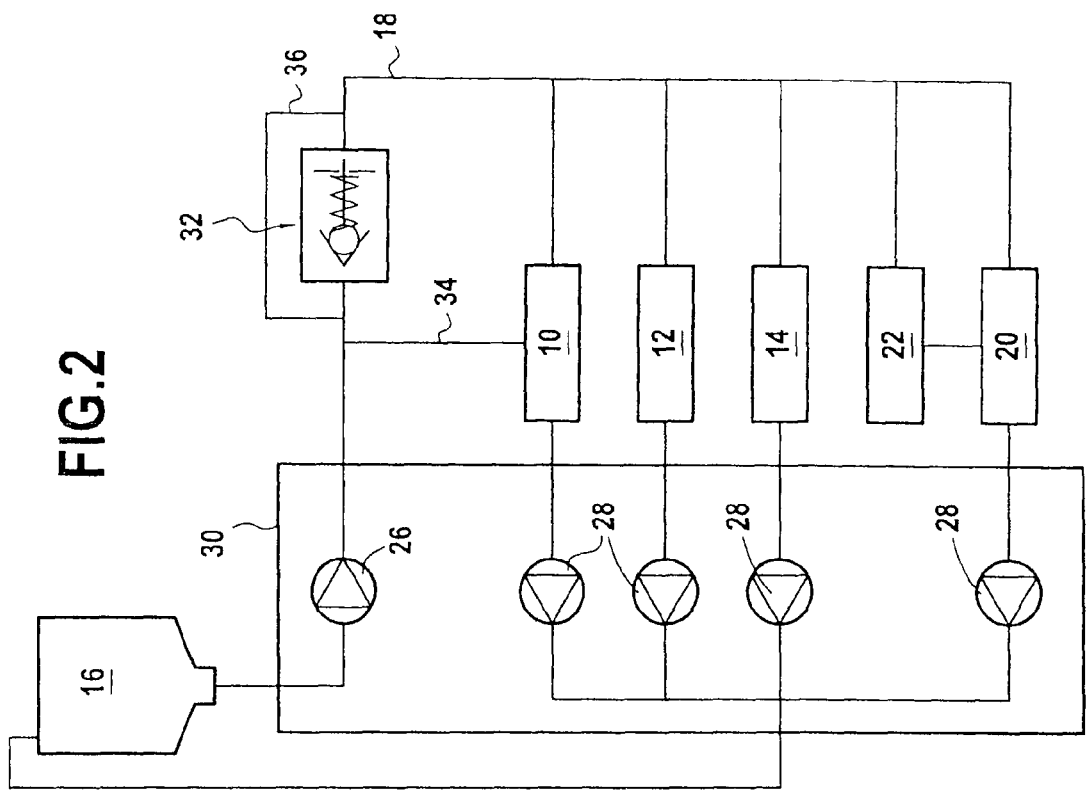
FIG. 1 is a diagrammatic view of a circuit of the invention for feeding oil to rolling bearings of the invention.

The oil used for cooling, lubricating, and feeding the squeeze films of the rolling bearings is delivered via a common oil feed circuit. FIG. 1 is a highly diagrammatic representation of an oil feed circuit of the invention for rolling bearings.

The circuit comprises in particular an oil supply 16 and an oil duct 18 connecting the supply to the lubrication enclosures 10 to 14, these enclosures being arranged in parallel with one another. The oil duct 18 also connects the supply to an accessory gearbox 20 of the turbojet and to a transfer gearbox 22, likewise connected in parallel relative to the enclosures.

The circuit also includes an oil feed pump 26 that is placed in the circuit 18 between the supply 16 and the lubrication enclosures 10 to 14 and the gearboxes 20, 22 in order to take oil from the supply and deliver it to those elements. In particular, the oil duct opens out into the rolling bearings via oil injection nozzles (not shown).

For each lubrication enclosure, there is also provided an oil recovery pump 28 that is mounted in the oil duct downstream from the enclosures in order to recover the oil that has been fed to the rolling bearings and return it to the supply 16. Similarly, a like oil recovery pump 28 serves to recover the oil that has been fed to the gearboxes 20, 22.

The oil feed pump 26 and the oil recovery pump 28 are mounted within a common unit 30 referred to as the "lubrication unit". These pumps are positive displacement rotary pumps and they are driven in rotation by taking power from the high pressure shaft of the turbojet.

According to the invention, the oil feed circuit further includes a pressurizing valve 32 that is placed in the oil duct 18 between the oil feed pump 26 and the lubrication enclosures 10 to 14 and the gearboxes 20, 22, and a branch connection duct 34 connecting the inlet of the pressurization valve to the front enclosure 10.

The pressurization valve 32 is suitable for greatly restricting, or even completely closing, the flow section and thus restricting the flow rate of oil flowing in the duct 18 so long as the pressure of oil at its inlet is less than a predetermined threshold pressure $P_S$, and for opening beyond said threshold pressure $P_S$. Preferably, the pressurization valve is of the check-valve closure type, with the check valve being kept in the closed position by a spring that is rated to compress at pressures at the inlet to the valve that are above the threshold pressure $P_S$. Such a valve is of simple design and of low cost.

Because of the branch connection duct 34, the pressure of oil fed to the front lubrication enclosure 10 increases greatly and quickly in order to reach the threshold pressure $P_S$, and it does so even at very low speeds of operation of the turbojet.

As a result, the pressurization valve 32 greatly reduces oil feed, or even prevents oil feed, to the rear lubrication enclosures 12, 14 or to the gearboxes 20, 22 so long as the pressure at its inlet has not reached the threshold pressure $P_S$. During this stage, the pressure of oil fed to the front enclosure 10—and thus to the front bearing—via the branch connection duct 34 increases until it reaches the threshold pressure $P_S$. Once the threshold pressure $P_S$ has been reached, the pressurization valve opens and allows the pressure of oil in the front enclosure 10 to be maintained at the level $P_S$.

By way of example, a value of 6 bars may be selected as the threshold pressure $P_S$. This value corresponds to the pressure level that it is desired to obtain for providing effective damping of the vibration generated by the shafts of the low- and high-pressure spools supported by the front bearing 10 while the turbojet is running at a sub-idling speed (e.g. of the order of 6000 revolutions per minute (rpm), compared with an idling speed of the order of 12,000 rpm for the shaft of the high pressure spool). Since the oil feed pump delivers oil at a rate that is proportional to the operating speed of the turbojet, the front bearing is fed with oil under pressure at very low speeds of operation (in particular at the sub-idling speed). Since the pressurizing valve is closed at such speeds, all of the oil pressure generated by the oil feed pump serves to feed the front bearing via the branch connection duct.

It should be observed that integrating such a pressurizing valve in the oil duct does not endanger the safety of the turbojet. In the event of the valve blocking in the open position, an absolute pressure sensor situated at the inlet to the valve serves to detect the problem by detecting a pressure that is abnormally low (or indeed abnormally high) for a given speed of operation. The same applies in the event of the valve becoming blocked in a partially open position. In the event of the valve not opening, the turbojet then being in a starting stage, stopping the engine will save it from damage. Finally, in the event of the valve not closing, the risk for the engine is minimal so long as it is not required to perform a large succession of starts.

Figure 2:
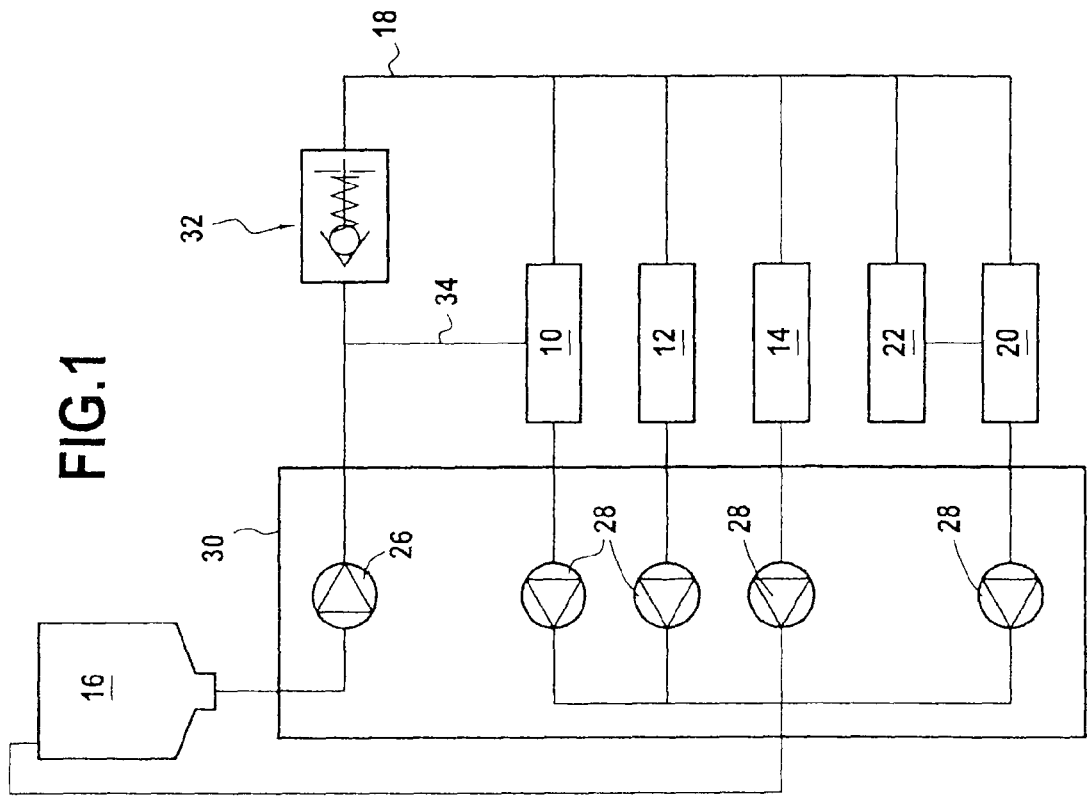
FIG. 2 is a diagrammatic view of another embodiment of a circuit of the invention.

With reference to FIG. 2, there follows a description of another embodiment of the oil feed circuit of the invention.

This oil feed circuit differs from that described with reference to FIG. 1 in that it further includes a bypass duct 36 connecting the inlet of the pressurizing valve 32 to its outlet. This bypass duct serves firstly to feed all of the lubrication enclosures 10 to 14 and the gearboxes 20, 22 with oil at a low rate, and secondly to ensure that a desired confirmation of pressure and oil flow rate is obtained in the front enclosure 10 at the desired speed of operation of the engine.

The section of the bypass duct 36 is calibrated to guarantee passing some minimum oil flow rate in order to ensure satisfactory operation of the rolling bearings at very low speeds of operation of the turbojet (i.e. before the pressurizing valve opens). By way of example, the bypass duct acts at these very low speeds of operation to pass about 5% to 10% of the oil flow rate that would be passed via the oil duct 18 if it were not closed by the pressurizing valve.

A variant of this other embodiment of the circuit of the invention consists in providing a calibrated leakage flow rate directly through the pressurizing valve. For example, with a check valve, the leakage flow rate may be achieved by ensuring that the check valve does not close completely when in its closed position, by ensuring that a small oil-passing section remains through the valve.

What is claimed is:

1. A circuit for feeding oil to rolling bearings in a turbomachine, the circuit comprising:
   an oil supply;
   an oil duct connecting the oil supply to a plurality of lubrication enclosures connected in parallel and each of the lubrication enclosures containing at least one rolling bearing;
   an oil feed pump disposed in the oil duct between the oil supply and the lubrication enclosures in order to take oil from the oil supply and deliver the oil to the rolling bearings; and
   an oil recovery pump connected downstream from each lubrication enclosure in order to recover the oil that has been fed to the rolling bearings and return the oil to the oil supply;
   a pressurizing valve placed in the oil duct between the oil feed pump and the lubrication enclosures, said pressurizing valve being adapted to open when a pressure at an inlet of the pressurizing valve exceeds a predetermined threshold pressure;
   a branch connection duct in direct fluid communication with the inlet of the pressurizing valve and one of the lubrication enclosures, the one of the lubrication enclosures being always fed with oil via the branch connection duct even when the pressure at the inlet of the pressurizing valve has not reached the predetermined threshold; and
   means for feeding the lubrication enclosures at a small oil flow rate when the pressure at the inlet of the pressurizing valve has not reached the predetermined threshold pressure,
   wherein an inlet of the branch connection duct is placed in the oil duct upstream of the inlet of the pressurizing valve and an outlet of the branch connection duct is placed in the one of the lubrication enclosures, and
   wherein the pressurizing valve is in direct fluid communication with the one of the lubrication enclosures.

2. A circuit according to claim 1, further comprising a bypass duct connecting the inlet of the pressurizing valve to an outlet of the pressurizing valve and having a flow section that is calibrated to allow lubrication enclosures to be fed with oil at a low flow rate.

3. A circuit according to claim 2, wherein the bypass duct is separate from the pressurizing valve, an inlet of the bypass duct is placed in the oil duct upstream of the inlet of the pressurizing valve, and an outlet of the bypass duct is placed in the oil duct downstream of the outlet of the pressurizing valve.

4. A circuit according to claim 1, wherein the pressurizing valve presents a calibrated leakage rate so as to enable lubrication enclosures to be fed with oil at a low flow rate.

5. A circuit according to claim 1, wherein the pressurizing valve is a check valve type having a rated spring.

6. A circuit according to claim 1, further comprising an accessory gearbox and a transfer gearbox connected to the oil supply by the oil duct and connected in parallel with the rolling bearings.

7. A circuit according to claim 1, including one lubrication enclosure situated at a front of the turbomachine and two lubrication enclosures situated at a rear of the turbomachine, the branch connection duct connecting the inlet of the pressurizing valve to the lubrication enclosure situated at the front.

8. A turbomachine including a circuit for feeding oil to rolling bearings according to claim 1.

9. A circuit according to claim 1, wherein said pressurizing valve is opened when a pressure of the one of the lubrication enclosures exceeds the predetermined threshold pressure.

10. A method of feeding oil to rolling bearings in a turbomachine, the bearings being connected in parallel in an oil circuit, the method comprising:
    taking oil from an oil supply and delivering the oil to lubrication enclosures each containing at least one rolling bearing via an oil duct; and
    recovering the oil that has been fed to the lubrication enclosures and returning the oil to the supply;
    wherein a flow rate of oil fed to certain lubrication enclosures is reduced when an oil feed pressure to one of the lubrication enclosures is less than a predetermined threshold pressure,
    wherein a pressurizing valve placed in the oil duct between the oil supply and the lubrication enclosures, said pressurizing valve being adapted to open when a pressure at an inlet of the pressurizing valve exceeds the predetermined threshold pressure,
    wherein a branch connection duct is placed in direct fluid communication with the inlet of the pressurizing valve and the one of the lubrication enclosures, the one of the lubrication enclosures being always fed with oil via the branch connection duct even when the pressure at the inlet of the pressurizing valve has not reached the predetermined threshold,
    wherein an inlet of the branch connection duct in placed in the oil duct upstream of the inlet of the pressurizing valve and an outlet of the branch connection duct is placed in the one of the lubrication enclosures, and
    wherein the pressurizing valve is in direct fluid communication with the one of the lubrication enclosures.

11. A method according to claim 10, further comprising opening said pressurizing valve when a pressure of the one of the lubrication enclosures exceeds the predetermined threshold pressure.

12. A method according to claim 10, further comprising providing a bypass duct connecting the inlet of the pressurizing valve to an outlet of the pressurizing valve and having a flow section that is calibrated to allow lubrication enclosures to be fed with oil at a low flow rate.

13. A method according to claim 12, wherein the bypass duct is separate from the pressurizing valve, an inlet of the bypass duct is placed in the oil duct upstream of the inlet of the pressurizing valve, and an outlet of the bypass duct is placed in the oil duct downstream of the outlet of the pressurizing valve.

* * * * *